United States Patent
Lee et al.

(10) Patent No.: US 11,563,220 B2
(45) Date of Patent: Jan. 24, 2023

(54) CONNECTING MATERIAL FOR SOLID OXIDE FUEL CELL, MANUFACTURING METHOD THEREOF, AND SOLID OXIDE FUEL CELL COMPRISING SAME

(71) Applicants: LG CHEM, LTD., Seoul (KR); DAEGU GYEONGBUK INSTITUTE OF SCIENCE AND TECHNOLOGY, Daegu Daegu (KR)

(72) Inventors: Hunhyeong Lee, Daejeon (KR); Sanghyeok Im, Daejeon (KR); Doyeon Jeon, Daejeon (KR); Kang Taek Lee, Dalseong-gun Daegu (KR); Kwangwook Choi, Daejeon (KR); Tai Min Noh, Daejeon (KR); Dong Woo Joh, Dalseong-gun Daegu (KR); Imdadullah Thaheem, Dalseong-gun Daegu (KR)

(73) Assignees: LG CHEM, LTD., Seoul (KR); DAEGU GYEONGBUK INSTITUTE OF SCIENCE AND TECHNOLOGY, Daegu (KR)

(*) Notice: Subject to any disclaimer, the term of this patent is extended or adjusted under 35 U.S.C. 154(b) by 244 days.

(21) Appl. No.: 17/041,228

(22) PCT Filed: Jun. 20, 2019

(86) PCT No.: PCT/KR2019/007441
§ 371 (c)(1),
(2) Date: Sep. 24, 2020

(87) PCT Pub. No.: WO2019/245298
PCT Pub. Date: Dec. 26, 2019

(65) Prior Publication Data
US 2021/0013526 A1 Jan. 14, 2021

(30) Foreign Application Priority Data

Jun. 20, 2018 (KR) .................. 10-2018-0071092

(51) Int. Cl.
*H01M 8/0228* (2016.01)
*C01G 51/00* (2006.01)
(Continued)

(52) U.S. Cl.
CPC .......... *H01M 8/0228* (2013.01); *C01G 51/70* (2013.01); *H01M 8/021* (2013.01);
(Continued)

(58) Field of Classification Search
None
See application file for complete search history.

(56) References Cited

U.S. PATENT DOCUMENTS 8,293,143 B2 10/2012 Chartier et al.
9,276,272 B2 3/2016 Lee et al.
(Continued)

FOREIGN PATENT DOCUMENTS

EP 3 678 242 A1 7/2020
JP 2004-533400 A 11/2004
(Continued)

OTHER PUBLICATIONS

Xu et al., Cu doped Mn—Co spinel protective coating on ferritic stainless steels for SOFC interconnect applications, Solid State Ionics, vol. 192, 2011, pp. 561-564. (Year: 2011).*
(Continued)

*Primary Examiner* — Daniel S Gatewood
(74) *Attorney, Agent, or Firm* — Birch, Stewart, Kolasch & Birch, LLP

(57) ABSTRACT

The present specification relates to a connecting material for a solid oxide fuel cell, comprising a conductive substrate;
(Continued)

and a ceramic protective film provided on one surface of the conductive substrate, in which the ceramic protective film comprises an oxide represented by Formula 1, a manufacturing method thereof, and a solid oxide fuel cell comprising the same.

14 Claims, 10 Drawing Sheets

(51) Int. Cl.
| | |
|---|---|
| *H01M 8/021* | (2016.01) |
| *H01M 8/0215* | (2016.01) |
| *C23C 4/11* | (2016.01) |
| *C23C 4/134* | (2016.01) |
| *H01M 8/12* | (2016.01) |

(52) U.S. Cl.
CPC ....... *H01M 8/0215* (2013.01); *C01P 2002/50* (2013.01); *C01P 2002/72* (2013.01); *C01P 2002/74* (2013.01); *C01P 2002/76* (2013.01); *C01P 2006/32* (2013.01); *C01P 2006/40* (2013.01); *C23C 4/11* (2016.01); *C23C 4/134* (2016.01); *H01M 2008/1293* (2013.01)

(56) References Cited

U.S. PATENT DOCUMENTS

| | | | |
|---|---|---|---|
| 2013/0230792 A1* | 9/2013 | Wilson | C23C 4/11 429/509 |
| 2016/0020471 A1 | 1/2016 | Wilson et al. | |

FOREIGN PATENT DOCUMENTS

| | | |
|---|---|---|
| JP | 2016-189243 A | 11/2016 |
| KR | 10-2014-0120170 A | 10/2014 |
| KR | 10-2015-0049384 A | 5/2015 |
| KR | 10-2017-0026904 A | 3/2017 |
| KR | 10-2019-0044546 A | 4/2019 |
| WO | WO 2009/094289 A2 | 7/2009 |
| WO | WO 2011/096939 A1 | 8/2011 |

OTHER PUBLICATIONS

Brylewski et al., "Structure and electrical properties of Cu-doped Mn—Co—O spinel prepared via soft chemistry and its application in intermediate-temperature solid oxide fuel cell interconnects", Journal of Power Sources, vol. 333, 2016, pp. 145-155.

International Search Report issued in PCT/KR2019/007441 (PCT/ISA/210), dated Sep. 23, 2019.

Thaheem et al., "Highly conductive and stable Mn1.35Co1.35CuO.2Y0.1O4 spinel protective coating on commercial ferritic stainless steels for intermediate-temperature solid oxide fuel cell interconnect applications", International Journal of Hydrogen Energy, vol. 44, Jan. 14, 2019, pp. 4293-4303.

Xu et al., "Cu doped Mn—Co spinel protective coating on ferritic stainless steels for SOFC interconnect applications", Solid State Ionics, vol. 192, 2011, pp. 561-564.

Mah et al., "Formation of sol-gel derived $(Cu,Mn,Co)_3O_4$ spinel and its electrical properties," Ceramics International, vol. 43, No. 10, 2017, pp. 7641-7646.

Xin et al., "Development of the spinel powder reduction technique for solid oxide fuel cell interconnect coating," International Journal of Hydrogen Energy, vol. 37, 2012, pp. 471-476.

* cited by examiner

[Figure 1]
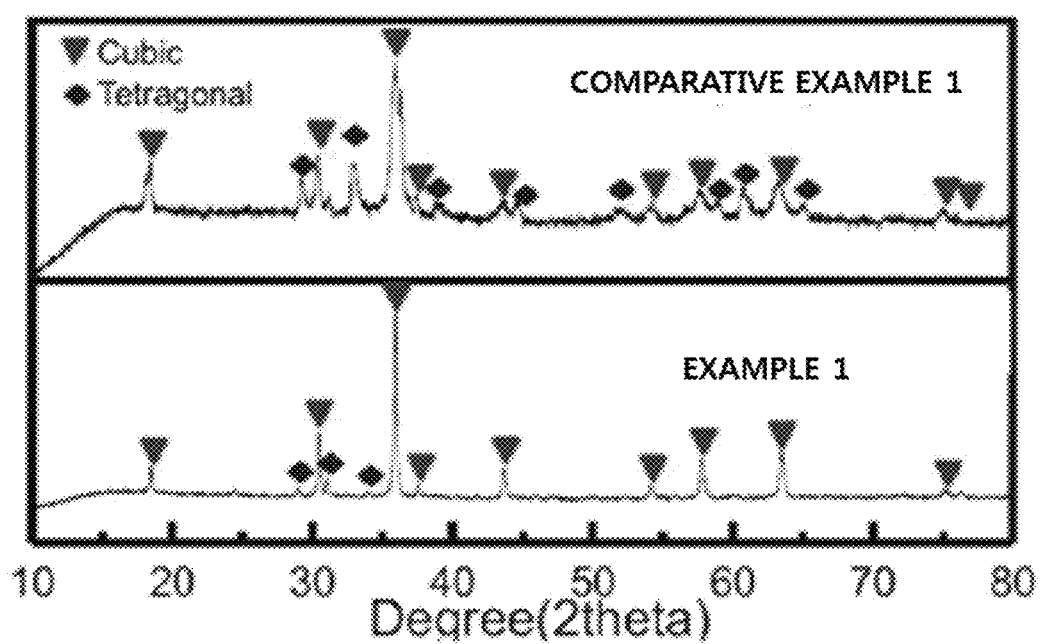

[Figure 2]
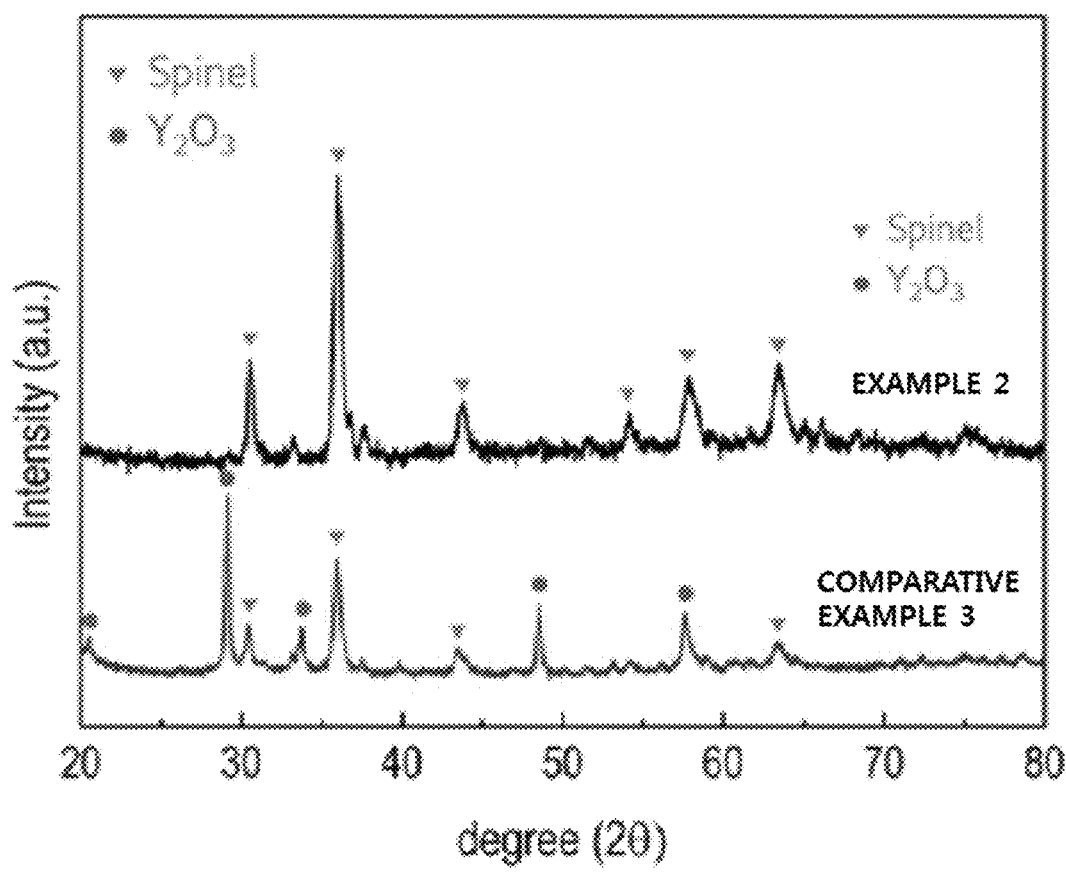
[Figure 3]
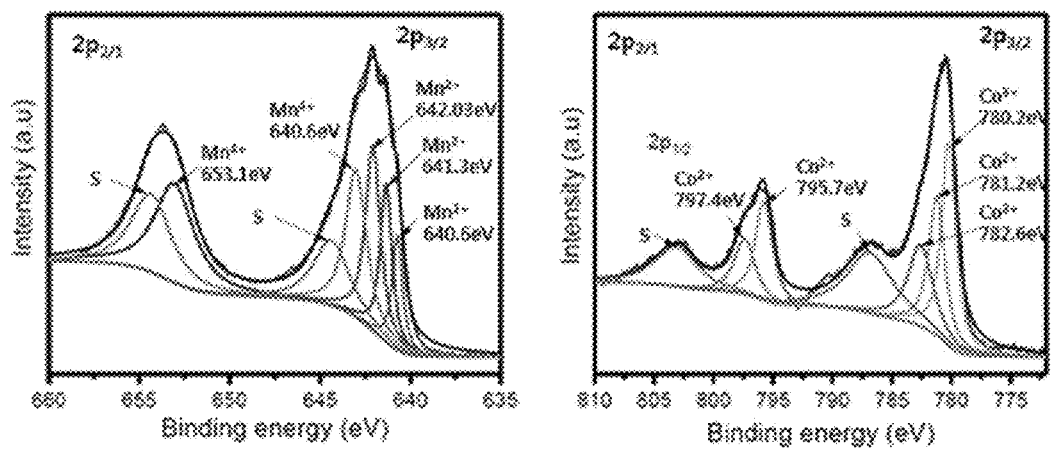

[Figure 4]
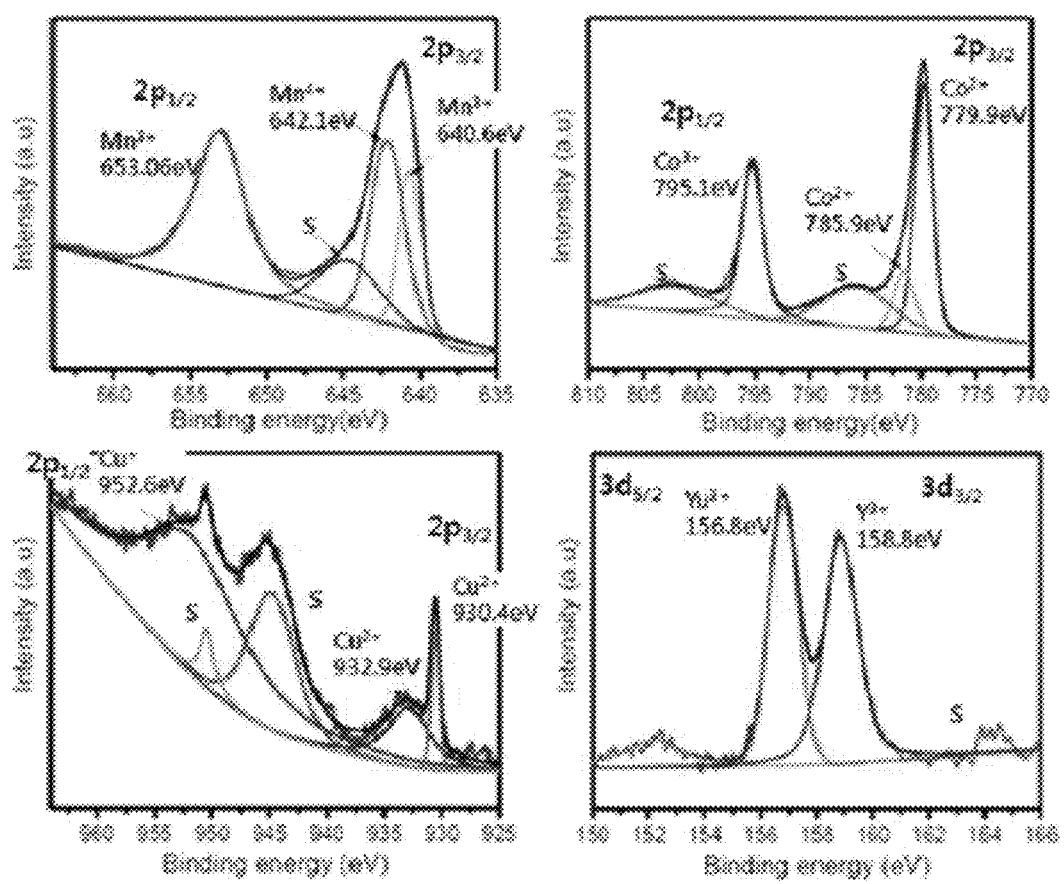

[Figure 5]
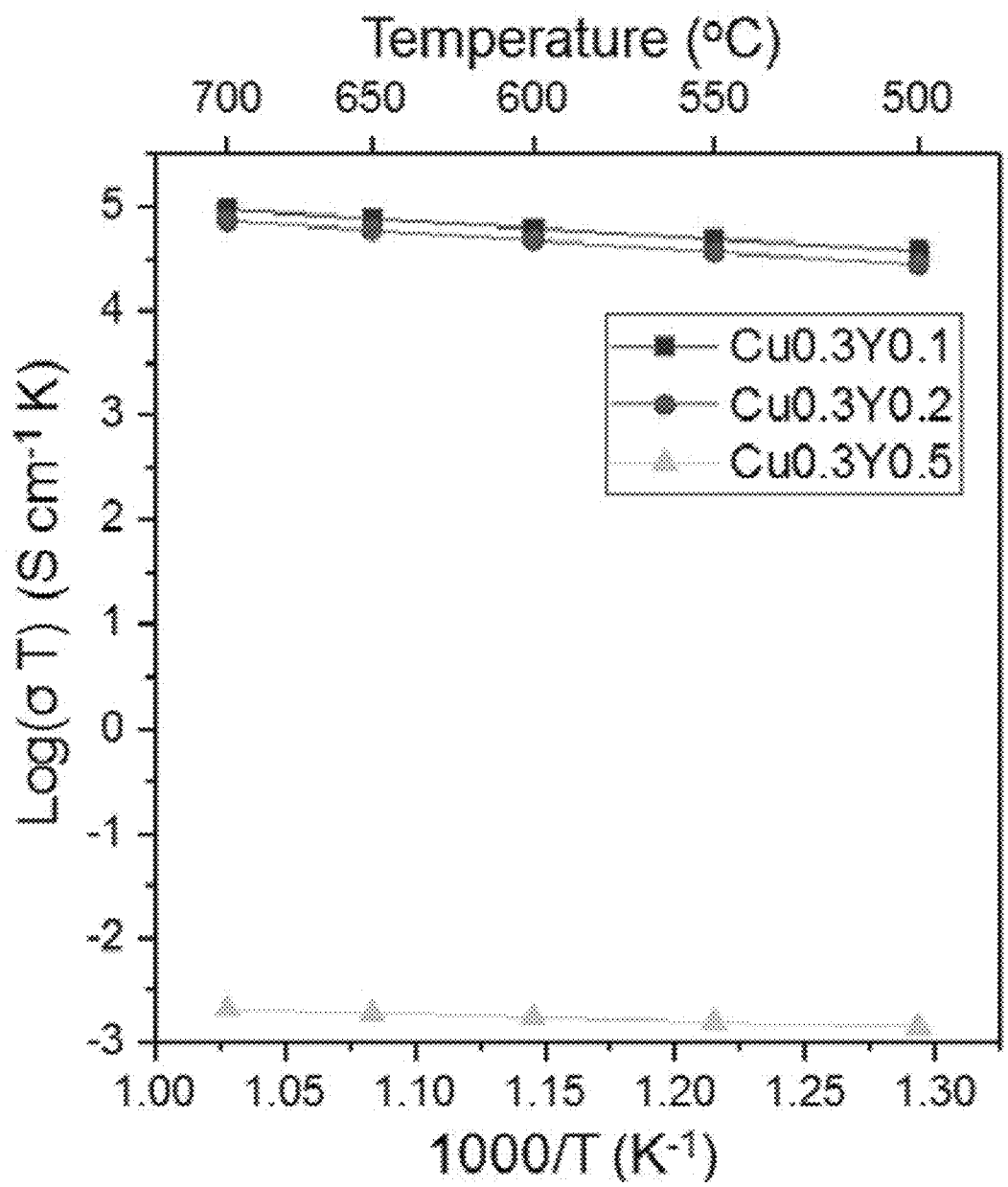

[Figure 6]
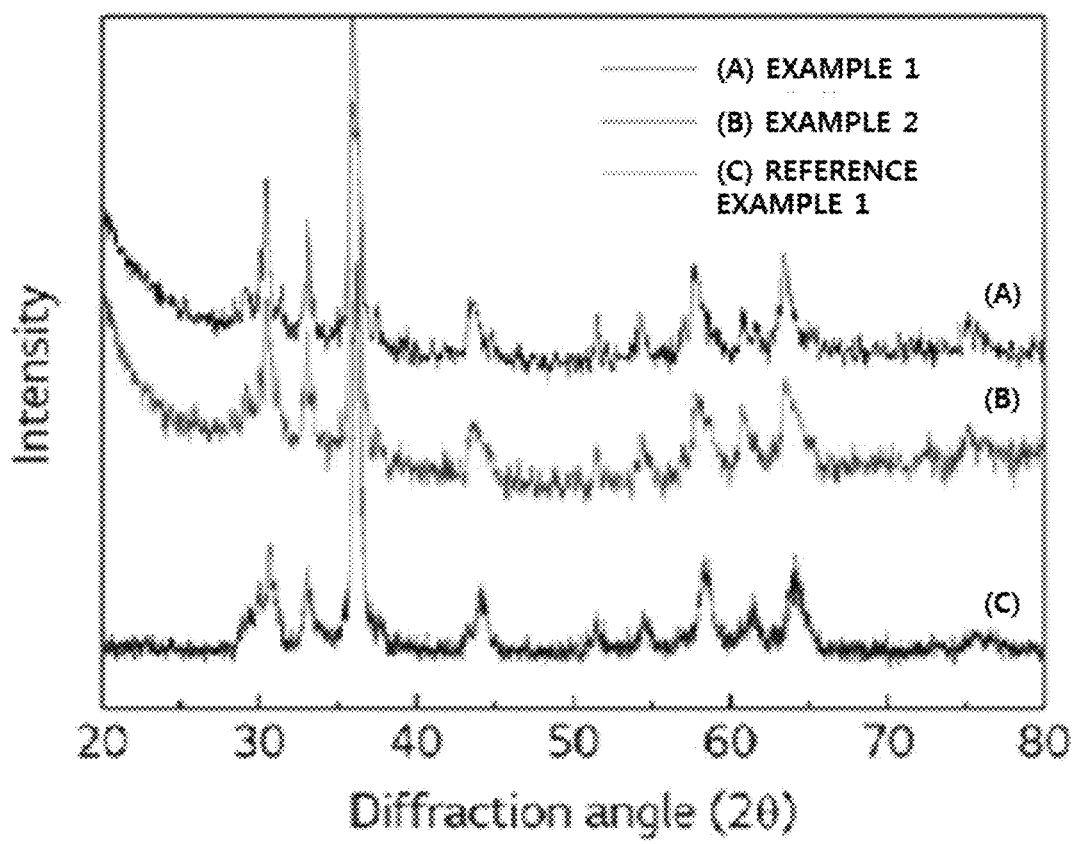
[Figure 7]
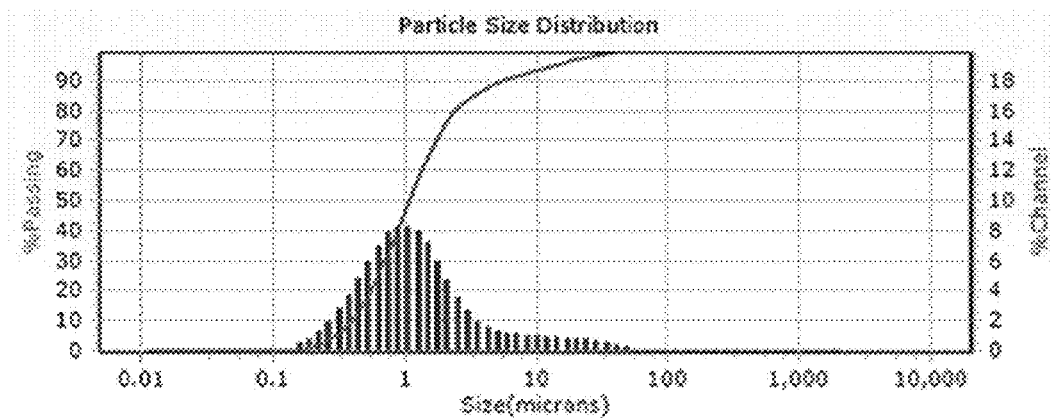

[Figure 8]
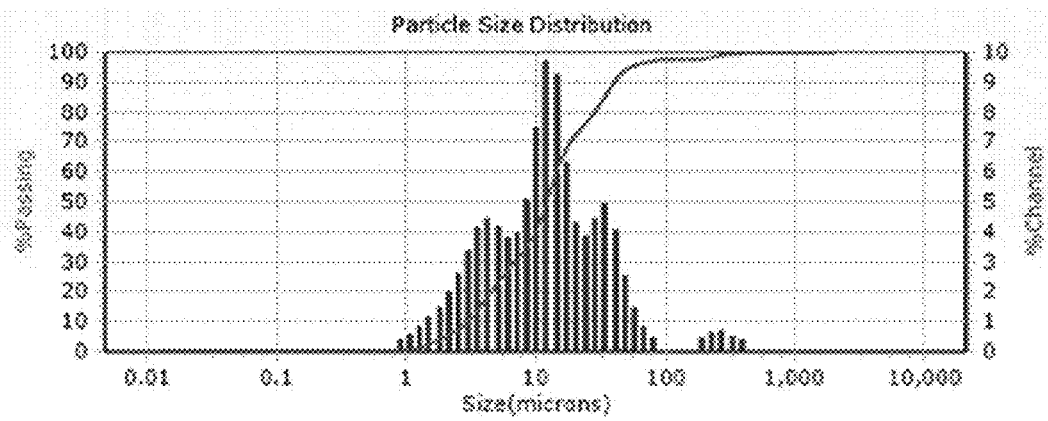
[Figure 9]
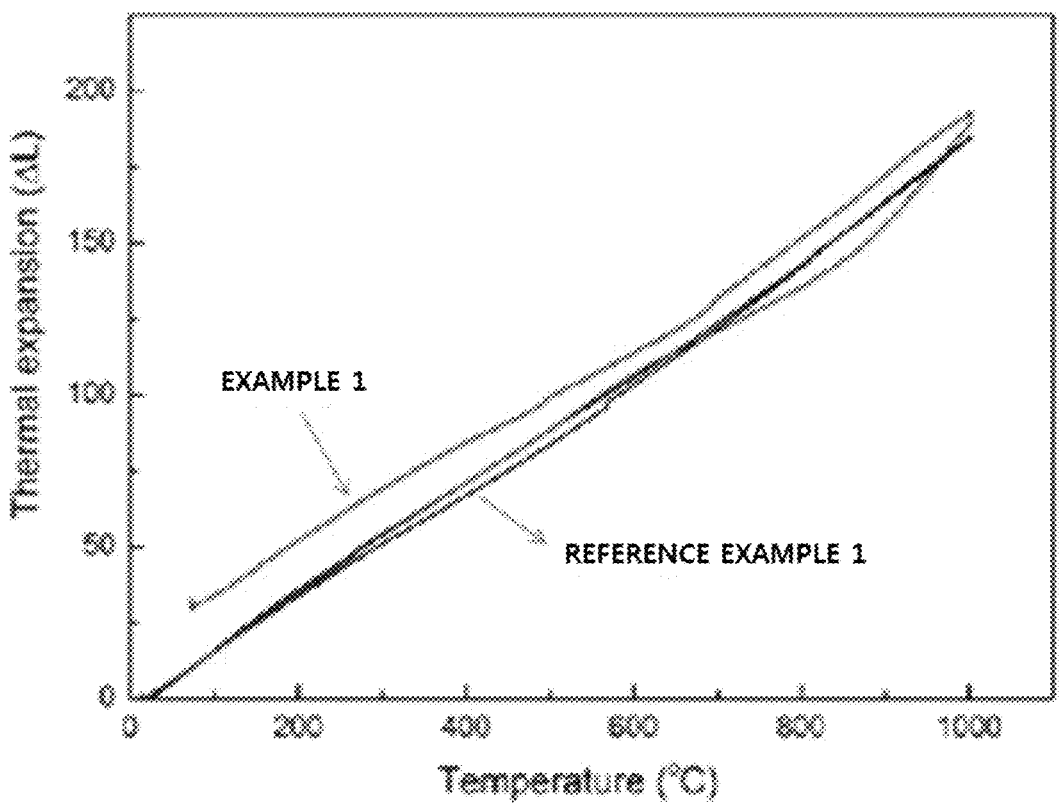

[Figure 10]
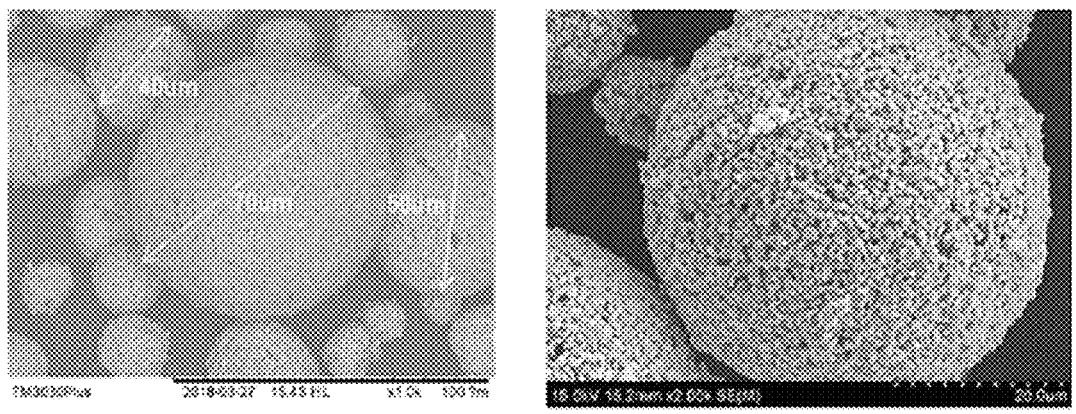
[Figure 11]
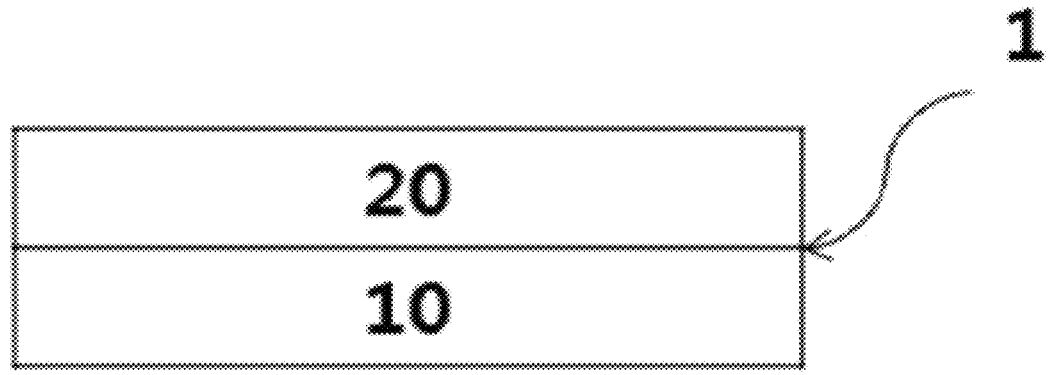

[Figure 12]
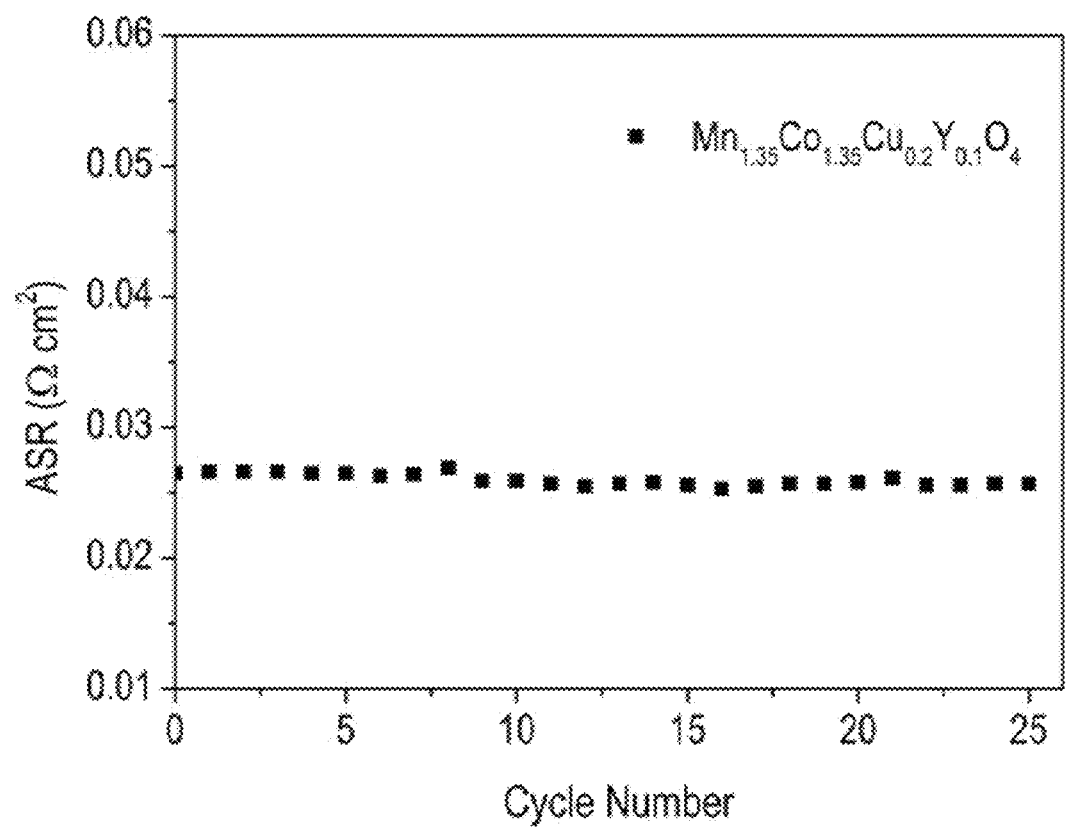

[Figure 13]
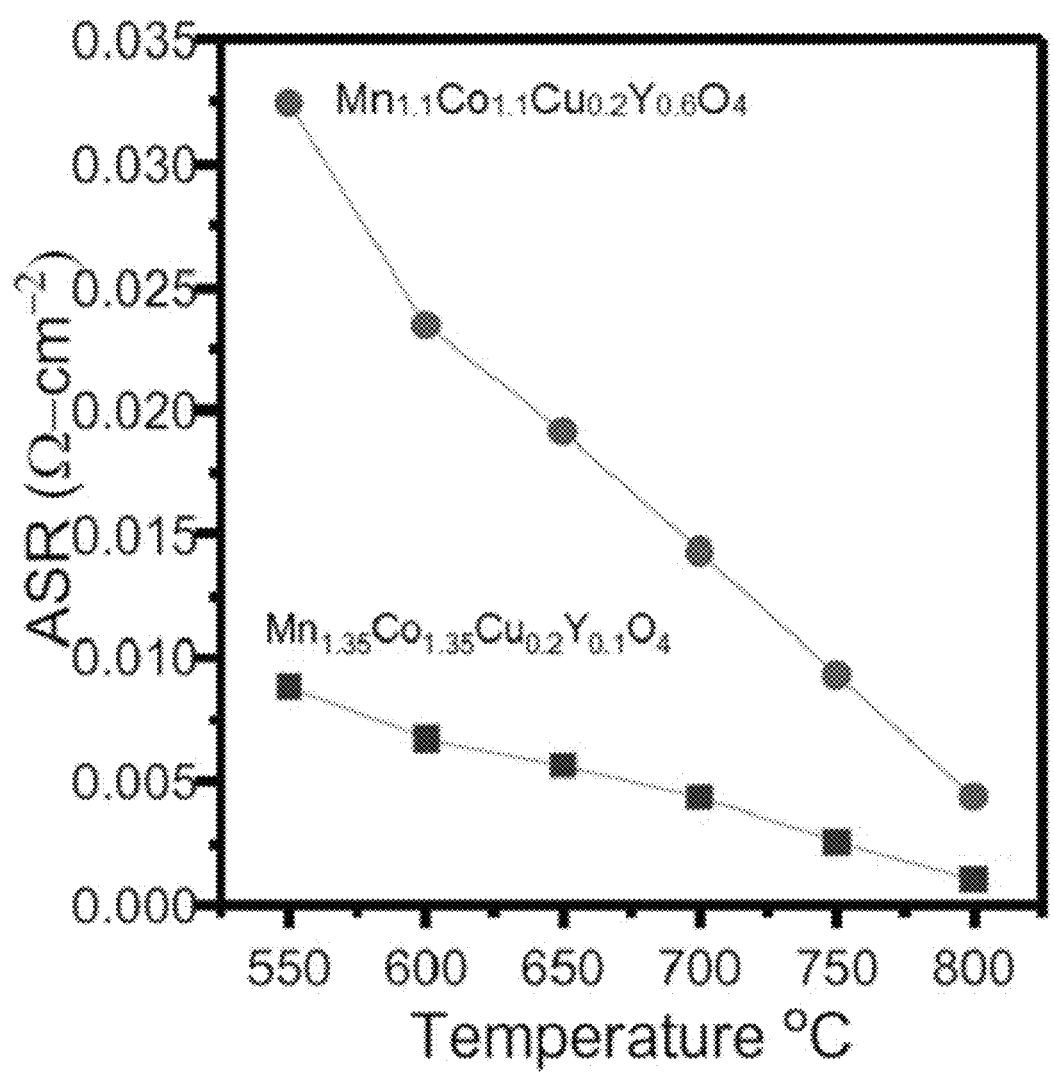

[Figure 14]
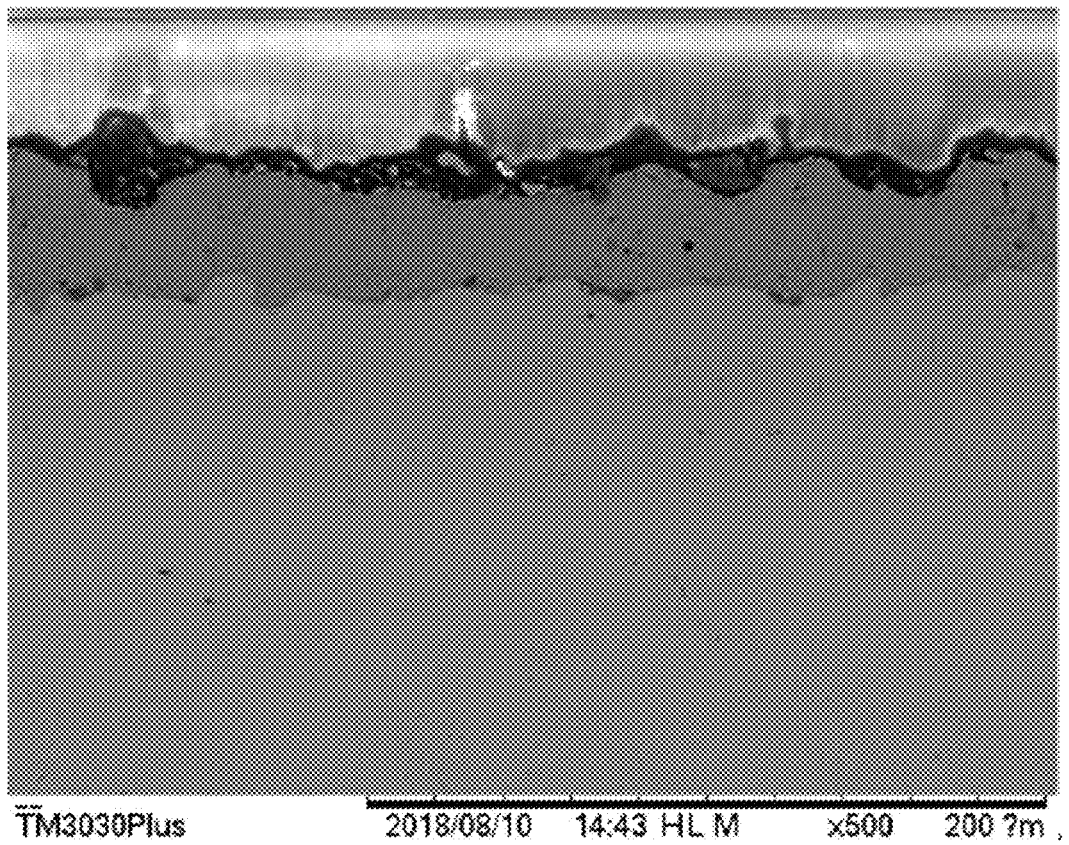

CONNECTING MATERIAL FOR SOLID OXIDE FUEL CELL, MANUFACTURING METHOD THEREOF, AND SOLID OXIDE FUEL CELL COMPRISING SAME

TECHNICAL FIELD

This application claims priority to and the benefit of Korean Patent Application No. 10-2018-0071092 filed in the Korean Intellectual Property Office on Jun. 20, 2018, the entire contents of which are incorporated herein by reference.

The present specification relates to a connecting material for a solid oxide fuel cell, a manufacturing method thereof, and a solid oxide fuel cell comprising the same.

BACKGROUND ART

A solid oxide fuel cell (SOFC) is an electrochemical device having high power generation efficiency without requiring an expensive noble metal catalyst required by other fuel cells. Further, there are many advantages in that various hydrocarbon-based fuels may be used without an expensive modifier, and the like because the solid oxide fuel cell can utilize a system with various capacities, can be applied widely from power generation to an auxiliary power supply, and use an oxygen ion conductive material as an electrolyte.

Studies over the last few years have brought a remarkable progress in lowering the operation temperature of SOFC to around 600 to 900° C., and accordingly, it is possible to replace a ceramic connecting material with a metal connecting material as a connecting material (separating plate) which is one of the SOFC constituting elements. The connecting material is an important element which is positioned between unit batteries to electrically connect a fuel electrode and an air electrode and separates a fuel gas and the air in an SOFC stack, is easily processed when a ceramic connecting material is replaced with a metal connecting material, and has many advantages such as excellent physical and electrical properties.

As a metal recently proposed, there is an Fe-based alloy steel comprising C (16 to 22%) (for example: Crofer22APU from ThyssenKrupp AG, Germany, ZMG 232 from Hitachi Metals, Ltd., Japan, and the like), and there are advantages in that the Fe-based alloy steel has better processability than other metals, and has a heat expansion coefficient similar to that of an electrode material, and the like, so that many studies for applying the same have been conducted. However, when an Fe—Cr-based metal is used as a connecting material, volatile chromium such as $CrO_2(OH)$ is generated from the metal under an oxidation atmosphere at high temperature, so that there is a problem in that the catalytic activity of the electrolyte and positive electrode of each cell deteriorates and there is a problem in that high contact resistance is generated due to a non-conductive oxide produced on the surface of metal. Accordingly, it is an important technical matter to secure a material for a metal connecting material, which has high corrosion resistance and highly conductive surface characteristics. As a method for improving the same, there are methods for developing a new alloy material or subjecting the surface thereof to a surface treatment with a conductive metal, a non-metallic coating, and the like so as to satisfy a function required by a separation plate.

Recently, attempts have been made to coat the surface of an existing commercial metal with a protective film, various coating methods such as an electroplating method, a sputtering deposition method, and a plasma spray coating method have been attempted, but due to high coating costs and difficulties to select coating conditions, there is a need for improving the coating methods.

PRIOR ART DOCUMENT

Patent Document (Patent Document 1) Korean Patent Application Laid-Open No. 2014-0120170

DETAILED DESCRIPTION OF INVENTION

Technical Problem

The present specification provides a connecting material for a solid oxide fuel cell.

Further, the present specification provides a method for manufacturing the connecting material for a solid oxide fuel cell.

In addition, the present specification provides a solid oxide fuel cell comprising the connecting material for a solid oxide fuel cell.

Technical Solution

The present specification provides a connecting material for a solid oxide fuel cell, comprising a conductive substrate; and a ceramic protective film provided on one surface of the conductive substrate, in which the ceramic protective film comprises an oxide represented by the following Formula 1.

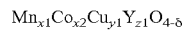  [Formula 1]

$$Mn_{x1}Co_{x2}Cu_{y1}Y_{z1}O_{4-\delta}$$

In Formula 1, x1, x2, y1, and z1 denote a molar ratio of each component and satisfy the ranges of $0<x1\leq1.5$, $0<x2\leq1.5$, $0<y1\leq0.5$, and $0.1\leq z1\leq0.4$, and $\delta$ is a value that makes the oxide neutral.

In addition, the present specification provides a method for manufacturing the above-described connecting material for a solid oxide fuel cell, the method comprising: producing a powder of an oxide represented by the following Formula 1; and forming a ceramic protective film comprising an oxide represented by the following Formula 1 on one surface of a conductive substrate.

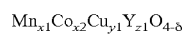  [Formula 1]

$$Mn_{x1}Co_{x2}Cu_{y1}Y_{z1}O_{4-\delta}$$

In Formula 1, x1, x2, y1, and z1 denote a molar ratio of each component and satisfy the ranges of $0<x1\leq1.5$, $0<x2\leq1.5$, $0<y1\leq0.5$, and $0.1\leq z1\leq0.4$, and $\delta$ is a value that makes the oxide neutral.

Furthermore, the present specification provides a solid oxide fuel cell comprising: two or more unit cells; and a connecting material layer comprising the above-described connecting material for a solid oxide fuel cell provided between the two or more unit cells, in which the unit cell comprises a fuel electrode, an air electrode, and an electrolyte provided between the fuel electrode and the air electrode, and the connecting material layer is brought into contact with the air electrode or fuel electrode of the unit cell.

Advantageous Effects

Since the connecting material for a solid oxide fuel cell according to an exemplary embodiment of the present specification comprises an oxide that is excellent in chemical and structural stability, there is an advantage in that the connecting material is thermally stable and has high electrical conductivity.

Further, since the connecting material for a solid oxide fuel cell according to an exemplary embodiment of the present specification comprises an oxide having a single phase, there is an advantage in that the connecting material is thermally stable and has high electrical conductivity.

In addition, when the connecting material for a solid oxide fuel cell is applied to a solid oxide fuel cell, there is an advantage in that the electrical conductivity may be maintained at a high level.

BRIEF DESCRIPTION OF DRAWINGS

FIGS. 1 and 2 are XRD diagrams of Experimental Example 1.

FIGS. 3 and 4 illustrate the XPS spectra of Experimental Example 2.

FIG. 5 is an electrical conductivity measurement graph of Experimental Example 3.

FIG. 6 illustrates an XRD diagram of the powder used in Example 1 and Reference Example 1.

FIGS. 7 and 8 illustrate the particle diameter distributions of the powders used in Example 1 and Reference Example 1, respectively.

FIG. 9 illustrates the heat expansion coefficients of the powders used in Examples 1 and 2 and Reference Example 1.

FIG. 10 illustrates the aggregated form of the powder particles used in Example 1.

FIG. 11 illustrates a stacked form of a connecting material for a solid oxide fuel cell according to an exemplary embodiment of the present specification.

FIGS. 12 and 13 are the area specific resistance measurement graphs of Experimental Example 6.

FIG. 14 is a cross-section of the connecting material for a solid oxide fuel cell of Experimental Example 7.

BEST MODE

Hereinafter, the present specification will be described in more detail.

In the present specification, "comprise(s)" means that another configuration may be further included.

The present specification provides a connecting material for a solid oxide fuel cell, comprising a conductive substrate; and a ceramic protective film provided on one surface of the conductive substrate, in which the ceramic protective film comprises an oxide represented by the following Formula 1.

[Formula 1]

In Formula 1, x1, x2, y1, and z1 denote a molar ratio of each component and satisfy the ranges of $0 < x1 \leq 1.5$, $0 < x2 \leq 1.5$, $0 < y1 \leq 0.5$, and $0.1 \leq z1 \leq 0.4$, and δ is a value that makes the oxide neutral.

Formula 1 is an oxide having a spinel structure, and has a composition of $AB_2O_4$. In this case, Mn may be present in the valence form of $Mn^{2+}$, $Mn^{3+}$ and $Mn^{4+}$, and $Mn^{2+}$ is located at the A site and $Mn^{3+}$ and $Mn^{4+}$ are located at the B site, thereby being located and mixed at the A site and the B site. In this case, a spinel structure in which the tetragonal phase and the cubic phase are present together is formed. When the two phases are simultaneously present, due to the difference in heat expansion coefficient between the two phases, a phenomenon in which a protective film is lifted up or cracked is observed during the operation at high temperature for a long period of time. Accordingly, the $Mn^{2+}$ and $Mn^{3+}$ ions need to be oxidized and transformed into the form of $Mn^{3+}$ and $Mn^{4+}$.

In the present specification, by simultaneously doping a manganese cobalt oxide (MCO) with copper (Cu) and yttria (Y), $Mn^{2+}$ and $Mn^{3+}$ ions are induced into $Mn^{3+}$ and $Mn^{4+}$ ions and $Mn^{3+}$ and $Mn^{4+}$ ions having different oxidation states may be located at the same octahedral site. Through this, most of the oxides are present in a stable state as one cubic phase, so that it was possible to prevent the phenomenon in which a protective film is lifted up or cracked from occurring even when the oxide is used at high temperature for a long period of time. Further, the electrical conductivity of a ceramic protective film may be improved using a small polaron hopping phenomenon in a spinel phase.

In an exemplary embodiment of the present specification, the connecting material for a solid oxide fuel cell comprises a conductive substrate. The "conductive substrate" means a substrate having high electrical conductivity, and this matter will be described below.

In an exemplary embodiment of the present specification, the connecting material for a solid oxide fuel cell comprises a ceramic protective film provided on one surface of the conductive substrate. The ceramic protective film is provided on one surface of a conductive substrate, and thus serves to protect the conductive substrate.

A stacking structure of the connecting material for a solid oxide fuel cell according to an exemplary embodiment of the present specification is illustrated in FIG. 11. FIG. 11 illustrates a connecting material 1 for a solid oxide fuel cell in which a ceramic protective film 20 is stacked on one surface of a conductive substrate 10.

In an exemplary embodiment of the present specification, the connecting material for a solid oxide fuel cell comprises the oxide represented by Formula 1. In this case, the performance of a ceramic protective film may be improved by adjusting the composition ratio of an oxide represented by Formula 1.

In an exemplary embodiment of the present specification, the oxide represented by Formula 1 may have a spinel structure.

In an exemplary embodiment of the present specification, the oxide is an oxide comprising manganese (Mn) and cobalt (Co) doped with copper (Cu) and yttria (Y). When an oxide is simultaneously doped with copper and yttria, the durability may be improved more than when the oxide is doped with only copper (Cu). Further, the electrical conductivity may be improved more than when the oxide is doped with only yttria (Y). In addition, when a degree to which the oxide is doped with copper (Cu) and yttria (Y) is adjusted, a large number of the oxides represented by Formula 1 exhibit a cubic phase, so that the stability of the phase is improved.

In an exemplary embodiment of the present specification, y1 and z1 of Formula 1 may satisfy the range of $0 < y1 \leq 0.5$ and $0.1 \leq z1 \leq 0.3$, preferably the range of $0 < y1 \leq 0.5$ and $0.1 \leq z1 \leq 0.2$, and more preferably the range of $0 < y1 \leq 0.3$ and $0.1 \leq z1 \leq 0.2$. In this case, most of the oxides are present as a cubic phase, so that the above-described improvement effect of high-temperature durability may be increased.

In an exemplary embodiment of the present specification, the oxide represented by Formula 1 may be an oxide that is stabilized as a cubic phase by a volume ratio of 95% or more, and may be an oxide that is stabilized as a cubic phase by a volume ratio of 98% or more or 100% or more. Further, the oxide may be stabilized by the above-described volume ratio at a temperature interval of 25° C. to 1,000° C. When the oxide satisfies the above numerical range, most of the oxides show a cubic phase, so that there is an advantage in that the stability of the phase is maximized. The morphology of the phase of the oxide may be confirmed by an X-ray diffraction (XRD) spectrum analysis, and for example, when a spectrum of 32 to 34 degrees is strongly exhibited in an XRD spinel spectrum as in FIG. 1, a tetragonal phase is present in a large amount, and when a spectrum of 32 to 34 degrees is minimally exhibited or a spectrum of 35 to 37 degrees is strongly exhibited, the cubic phase is present in a large amount, or a single cubic phase is exhibited.

In an exemplary embodiment of the present specification, as a result of an X-ray diffraction (XRD) analysis, the oxide represented by Formula 1 may each have a single peak at 2θ in a range of 30 degrees to 32 degrees, 35 degrees to 37 degrees, 55 degrees to 58 degrees, and 62 degrees to 65 degrees. To have the single peak means that there is one peak having one main peak within the corresponding angle range. That is, the single peak means a peak from which the noise is removed. In addition, to have a single peak within the angle range means that most of the oxides are present as a cubic phase. Referring to FIG. 1, it could be confirmed that the oxide powder used in Example 1 usually had a cubic phase and the powder used in Comparative Example 1 has a large number of the tetragonal phases. This is because the oxide powder used in Example 1 comprises copper and yttria and the powder used in Comparative Example 1 does not comprise copper and yttria.

In an exemplary embodiment of the present specification, the oxide represented by Formula 1 comprises $Mn^{3+}$ ions and $Mn^{4+}$ ions. It can be seen through the position and intensity of a peak shown by X-ray photo-electron spectroscopy (XPS) whether the ions are included. That is, the oxidation state of manganese may be determined by the XPS analysis.

In the present specification, a peak to be described below may mean a peak (de-convoluted peak) separated from a main peak, unless otherwise mentioned.

In an exemplary embodiment of the present specification, as a result of subjecting the oxide represented by Formula 1 to an X-ray photo-electron spectroscopy (XPS) analysis, for the $2p_{3/2}$ peak of Mn, a peak (P3) may be present within a binding energy range of 640.6±0.2 eV and a peak (P4) may be present within a binding energy range of 642±0.2 eV. The peak within the binding energy range of 640.6±0.2 eV is a superstructure ordering peak resulting from $Mn^{3+}$, and the peak within the binding energy range of 642±0.2 eV means a superstructure ordering peak resulting from $Mn^{4+}$. When the peak ordering is the same as those described above, $Mn^{3+}$ and $Mn^{4+}$ ions are present in the oxide, and $M^{2+}$ ions are not present or are present in a small amount as compared to other ions ($Mn^{3+}$ and $Mn^{4+}$) in the oxide.

In an exemplary embodiment of the present specification, as a result of subjecting the oxide represented by Formula 1 to an X-ray photo-electron spectroscopy analysis, for the $2p_{3/2}$ peak of Mn in the oxide, a peak (P2) is present within a binding energy range of 641.7±0.2 eV, and the peak intensity (I2) of P2 may be smaller than the peak intensity (I3) of P3 and the peak intensity (I4) of P4. The superstructure ordering peak means a superstructure ordering peak resulting from $Mn^{2+}$. The case where the peak ordering is the same as those described above means that the number of $Mn^{2+}$ is smaller than the number of $Mn^{4+}$ and $Mn^{3+}$, in the oxide particle. When the number of $Mn^{2+}$ is large, $Mn^{2+}$ is present in the A-site of $AB_2O_4$, so that there is a problem in that the oxide is present as a tetragonal phase. However, when the number of $Mn^{2+}$ is small, $Mn^{2+}$ present in the A-site of $AB_2O_4$ is rarely present, so that the oxide may be present as a single phase (cubic phase).

In an exemplary embodiment of the present specification, as a result of subjecting the oxide represented by Formula 1 to an X-ray photo-electron spectroscopy analysis, for the $2p_{3/2}$ orbital of Mn in the oxide, a peak (P2) is present within a binding energy range of 641.7±0.2 eV, and the peak intensity (I2) of P2 may be 20% or less, preferably 10% or less, and more preferably 5% or less of the peak intensity (I3) of P3. The peak intensity may be calculated by the area of each peak.

In an exemplary embodiment of the present specification, as a result of subjecting the oxide represented by Formula 1 to an X-ray photo-electron spectroscopy analysis, for the $2p_{3/2}$ orbital Mn in the oxide, a peak may not be present within a binding energy range of 641.7±0.2 eV. When the peak ordering is the same as those described above, only $Mn^{3+}$ and $Mn^{4+}$ ions are present and $Mn^{2+}$ ions are not present, in the oxide.

In an exemplary embodiment of the present specification, a ratio of the peak intensity (I3) within the binding energy range of 640.6±0.2 eV to the peak intensity (I4) within the binding energy range of 643±0.2 eV may satisfy a range of $1.0 \leq I4/I3 \leq 2.0$, preferably a range of $1.3 \leq I4/I3 \leq 1.9$, and more preferably a range of $1.4 \leq I4/I3 \leq 1.8$.

In an exemplary embodiment of the present specification, the electrical conductivity of the ceramic protective film at 650° C. may be 30 S/cm or more, 40 S/cm, preferably 50 S/cm or more, and more preferably 60 S/cm or more. When the ceramic protective film is applied to a solid oxide fuel cell, the electrical conductivity of the ceramic protective film is excellent, so that there is an advantage in that the performance of the fuel cell itself may be enhanced.

The electrical conductivity may be measured by a method generally used in the field to which this technology belongs. For example, a 4-point probe method may be used. First, an electric current flowing through terminals 1 and 4 and a voltage between terminals 2 and 3 are measured, and the ratio of the electric current to the voltage is measured using Ohm's law.

A voltage is obtained using the 4-point probe method, and a surface resistance (Ω/□) is obtained by multiplying a correction coefficient by the voltage. The correction coefficient is a value calculated by a measurement device in consideration of the size and thickness of a test specimen, the temperature during the measurement, and the like.

A specific resistance (Ω/cm) may be obtained by multiplying the thickness (t) of a test specimen by the calculated surface resistance (Ω/□), and the reciprocal of the specific resistance thus obtained may be converted into the electrical conductivity.

Specifically, after both surfaces of an STS441 substrate with a size of 2 cm×2 cm×2 mm are coated with the oxide represented by Formula 1 by an atmospheric plasma spray (APS) method, a resistance value is measured by attaching a Pt mesh with a size of 1 cm×1 cm to both surfaces, connecting a wire thereto, and using a 4-probe multi-meter, and electrical conductivity is calculated by converting the resistance value.

When the above numerical ranges are satisfied, the solid oxide fuel cell has an advantage in that the electrical conductivity is excellent at about 650° C., which is a driving temperature of the solid oxide fuel cell.

In an exemplary embodiment of the present specification, an area specific resistance (ASR) of the ceramic protective film at 650° C. may be 0.1 Ωcm² or less, 0.05 Ωcm² or less, or 0.02 Ωcm² or less.

When the electrical conductivity and area specific resistance values of the ceramic protective film are the same as the above numerical ranges, the electrical conductivity of the connecting material is high, so that there is an effect in that when the connecting material is applied to a solid oxide fuel cell, the performance of the fuel is excellent.

In an exemplary embodiment of the present specification, a heat expansion coefficient of the ceramic protective film at 650° C. may be 11 $(10^{-6}*K^{-1})$ to 12 $(10^{-6}*K^{-1})$, 11.10 $(10^{-6}*K^{-1})$ to 12 $(10^{-6}*K^{-1})$, preferably 11.20 $(10^{-6}*K^{-1})$ to 11.80 $(10^{-6}*K^{-1})$. When the above numerical range is satisfied, there are advantages in that the heat resistance is excellent due to the low heat expansion coefficient of the ceramic protective film, and the compatibility of the ceramic protective film with other configurations of the fuel cell is excellent due to the heat expansion coefficient of the ceramic protective film, which is similar to the heat expansion coefficients of the other configurations. The heat expansion coefficient may be measured by a method generally used in the field to which this technology belongs. For example, after the ceramic protective film is molded into the form of a pellet having a dimension of 3 mm (W)×3 mm (D)×15 mm (L), the heat expansion coefficient may be measured by using a heat expansion coefficient measurement device (Dilatometer, using an L75 model manufactured by Linseis) to increase the temperature at a heating rate of 5° C./min starting from 25° C. to a temperature of 1,000° C. or more and measuring the degree (dL) to which the length is expanded as compared to the initial length (L0).

In an exemplary embodiment of the present specification, the ceramic protective film may have a thickness of 10 μm to 30 μm, preferably 20 μm to 30 μm. When the above numerical range is satisfied, there are advantages in that it is possible to prevent an oxide layer from being formed between the conductive substrate and the ceramic protective film by effectively suppressing oxygen ions in the ceramic protective film from moving, and it is possible to maintain electrical conductivity at a high level. The thickness of the ceramic protective film may mean the shortest distance among the distances between the interface of the ceramic protective film and the conductive substrate and the interface at which the ceramic protective film is brought into contact with the atmosphere by capturing a cross-sectional photograph of the connecting material.

The solid oxide fuel cell according to an exemplary embodiment of the present specification comprises a conductive substrate.

In an exemplary embodiment of the present specification, the conductive substrate is not limited as long as the conductive substrate has a high electronic conductivity while having a low ion conductivity. In general, there is a ceramic substrate such as $LaCrO_3$ or a metal substrate, and preferred examples thereof comprise a metal substrate.

In an exemplary embodiment of the present specification, the conductive substrate may be a ferritic stainless steel (FSS) substrate. When a plate of the ferritic stainless steel is used as a conductive substrate, there are advantages in that a stack temperature distribution is uniform due to the excellent heat conductivity, heat stress may be lowered in a flat plate-type stack, the mechanical strength is excellent, and the electrical conductivity is excellent.

In an exemplary embodiment of the present specification, the conductive substrate has a thickness of 1 mm to 5 mm, preferably 1.5 mm to 4.5 mm, and more preferably 2 mm to 4 mm. When the above numerical range is satisfied, there are advantages in that the electrical conductivity is high, and the mechanical strength is excellent.

In an exemplary embodiment of the present specification, the ferritic stainless steel may be one selected from the group comprising stainless steel 434 (STS434), stainless steel 444 (STS444), stainless steel 430 (STS430), stainless steel 409 (STS409), stainless steel 410L (STS410L), stainless steel 441 (STS441), ZMG232 (manufactured by Hitachi Metals, Ltd.), and Crofer22 (manufactured by ThyssenKrupp AG).

In an exemplary embodiment of the present specification, the conductive substrate has a heat expansion coefficient of $10.5 \times 10^{-6}$ $K^{-1}$ to $12.5 \times 10^{-6}$ $K^{-1}$, preferably $11.0 \times 10^{-6}$ $K^{-1}$ to $12.0 \times 10^{-6}$ $K^{-1}$ at a temperature interval of 873 K to 1,073 K. When the above numerical range is satisfied, it is possible to suppress the change in size of a conductive substrate depending on the change in temperature.

The present specification provides a method for manufacturing the above-described connecting material for a solid oxide fuel cell, the method comprising: producing a powder of an oxide represented by the following Formula 1; and forming a ceramic protective film comprising an oxide represented by the following Formula 1 on one surface of a conductive substrate.

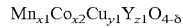

$$Mn_{x1}Co_{x2}Cu_{y1}Y_{z1}O_{4-\delta}$$ [Formula 1]

In Formula 1, x1, x2, y1, and z1 denote a molar ratio of each component and satisfy the ranges of $0 < x1 \leq 1.5$, $0 < x2 \leq 1.5$, $0 < y1 \leq 0.5$, and $0.1 \leq z1 \leq 0.4$, and δ is a value that makes the oxide neutral.

The method for manufacturing a connecting material for a solid oxide fuel cell of the present specification comprises producing a powder of the oxide represented by Formula 1.

In an exemplary embodiment of the present specification, the producing of the oxide represented by Formula 1 comprises: forming a mixed solution in a sol state by mixing a raw material powder, a solvent, and citric acid; gelling the mixed solution in a sol state by heating the mixed solution; drying the gel compound; and calcining the dried compound.

The method as described above is called a sol-gel method. The sol-gel method is a reaction in which colloidal particles with a size of several tens or hundreds mm obtained by hydrolysis or dehydration condensation become a gel from a sol due to the loss of the fluidity of the sol by the aggregation or condensation of colloidal particles by dispersing particulates and the like obtained from the sol dispersed in a liquid in another liquid.

When an oxide is produced by the sol-gel method as described above, there are advantages in that dense particles can be produced as compared to the solid phase synthesis method in the related art, and a granular powder for plasma spray coating may be easily produced because the produced particles are small. In particular, when citric acid is used in the sol-gel method, dissolved metal ions are chelated by a carboxyl group of citric acid (a complex ion produced by coordination-bonding between one ligand and metal ions at two or more sites) once the mixed solution is in a sol-gel state. The sol-gel method allows respective metal ions to be uniformly distributed during the calcination, thereby having an advantage in that a stoichiometric composition ratio is maintained even in the state of an oxide which is a final product.

The sol means that solid particles are dispersed in a liquid, and when the sol is heated or cooled, and a material having a certain morphology in a solid or semi-solid state refers to a gel. The sol is a fluid liquid in which solid colloidal particles, which are a dispersed phase, are dispersed, and the gel means that dispersed phase particles are brought into contact with each other, and as a result, the fluidity disappears as a whole because a dispersion medium is present in a small amount between the dispersed phase particles.

In an exemplary embodiment of the present specification, the raw material powder may comprise one or more selected from the group consisting of $Mn(NO_3)_2$; $Co(NO_3)_2$; $Y_2O_3$ and $Y(NO_3)_3$; and one or more selected from the group consisting of $CuO$ and $Cu(NO_3)_2$.

In an exemplary embodiment of the present specification, the solvent is not largely limited as long as the solvent is a material which disperses a raw material powder and is easily removed by drying the solvent, and a typical material known in the art may be used. For example, as the solvent, it is possible to use one or two or more selected from the group consisting of water (D.I water), isopropanol, toluene, ethanol, n-propanol, n-butyl acetate, ethylene glycol, butyl carbitol, and butyl carbitol acetate, and preferably, water (D.I water) or ethanol may be used.

In an exemplary embodiment of the present specification, the solvent may comprise citric acid.

In an exemplary embodiment of the present specification, a weight ratio of the citric acid to the raw material powder may be 3:1 to 1:3, preferably 2.5:1 to 1:1.

In an exemplary embodiment of the present specification, the gelling of the mixed solution in a sol state by heating the mixed solution may be performed by heating at a temperature of 50 to 80° C. The heating means is not particularly limited.

In an exemplary embodiment of the present specification, the calcining of the dried compound may be performed at 1,000° C. for 3 hours or more by increasing the temperature at a heating rate of 3 to 5° C./min from 25° C.

In an exemplary embodiment of the present specification, the forming of the ceramic protective film may be performed by a plasma spray coating.

In an exemplary embodiment of the present specification, the forming of the ceramic protective film may comprise performing a plasma spray coating using the oxide represented by Formula 1.

In an exemplary embodiment of the present specification, the performing of the plasma spray coating may comprise manufacturing the oxide represented by Formula 1 into a granular powder so as to be suitable for the plasma spray coating method.

In an exemplary embodiment of the present specification, the manufacturing of the oxide represented by Formula 1 into the granular powder may comprise: preparing a solution comprising the oxide represented by Formula 1; injecting the solution into a chamber at a temperature of 160 to 200° C. at a rate of 10 to 30 ml/min; and colliding the solution with the wall of the chamber by rotating the solution at a rate of 5,000 to 12,000 rpm. The method as described above refers to a spray drying method.

In an exemplary embodiment of the present specification, the solution comprising the oxide represented by Formula 1 may comprise one or more selected from the group consisting of a solvent and a binder.

In an exemplary embodiment of the present specification, a solvent used for the spray drying method may be D.I water.

In an exemplary embodiment of the present specification, a weight ratio of the oxide used for the spray drying method to the solvent may be 1:10 to 10:1.

In an exemplary embodiment of the present specification, the binder may be a polyvinyl alcohol binder.

In an exemplary embodiment of the present specification, the manufacturing of the oxide represented by Formula 1 into the granular powder may comprise heating the temperature to 900° C. at a heating rate of 5° C./min starting at 25° C., and performing a heat treatment. This step is performed so as to evaporate the solvent or binder included in the solution or granular powder and aggregate the powder.

In an exemplary embodiment of the present specification, before the forming of the ceramic protective film, it is possible to sequentially or simultaneously perform at least one of a process of checking whether a metal separation plate has abnormality such as a size and deformation in surface, straightness, and cracks, a process of washing the ceramic protective film and removing impurities, a process of performing a masking using a heat-resistant tape on a part except for the ceramic protective film, and a process of forming surface irregularities by performing blasting on a coating part.

In an exemplary embodiment of the present specification, it is possible comprise surface-treating a conductive substrate with an alumina powder using a sand blasting apparatus before the forming of the ceramic protective film.

In an exemplary embodiment of the present specification, the granular powder oxide may have a particle size of 10 μm to 90 μm.

In an exemplary embodiment of the present specification, the performing of the plasma spray coating may be performed by a spray gun which is disposed at a distance of 150 mm to 250 mm from the conductive substrate and moves at a rate of 100 to 300 mm/sec.

The present specification provides a solid oxide fuel cell comprising: two or more unit cells; and a connecting material layer comprising the above-described connecting material for a solid oxide fuel cell provided between the two or more unit cells, in which the unit cell comprises a fuel electrode, an air electrode, and an electrolyte provided between the fuel electrode and the air electrode, and the connecting material layer is brought into contact with the air electrode or fuel electrode of the unit cell.

The 'being brought into contact' means that the connecting material layer is brought into physical contact with the air electrode or fuel electrode of the unit cell, and does not mean that the air electrode or fuel electrode of the unit cell is brought into contact with and bonded to the entire area of the connecting material layer, but means that most of the air electrode or fuel electrode of the unit cell is brought into contact with and bonded to the entire area of the connecting material layer, and the spaced part also faces the corresponding surface even though the air electrode or fuel electrode is partially spaced apart from the entire area of the connecting material layer.

In an exemplary embodiment of the present specification, the unit cell is the most basic unit of the solid oxide fuel cell, and comprises a fuel electrode, an air electrode, and an electrolyte provided between the fuel electrode and the air electrode.

In an exemplary embodiment of the present specification, the fuel electrode is not particularly limited as long as the fuel electrode is formed of a material that is highly stable in a reducing atmosphere, and has high ion conductivity and high electronic conductivity. For example, the fuel electrode may be composed of a material in which nickel oxide (NiO) and yttria stabilized zirconia (YSZ) are mixed, and the material is not limited thereto.

In an exemplary embodiment of the present specification, the air electrode is not particularly limited as long as the air electrode is formed of a material that is highly stable in an oxidizing atmosphere, and has high ion conductivity and high electronic conductivity.

In an exemplary embodiment of the present specification, the electrolyte is not particularly limited as long as the electrolyte is formed of a material that is highly stable in an oxidizing and reducing atmosphere, and has high ion conductivity and low electronic conductivity. For example, as the electrolyte, yttria stabilized zirconia, (La, Sr) (Ga, Mg)$O_3$, Ba(Zr,Y)$O_3$, Gd doped $CeO_2$ (GDC), $Y_2O_3$ doped $CeO_3$ (YDC), yttrium stabilized zirconia (YSZ), scandium stabilized zirconia (ScSZ), and the like are used, and the electrolyte is not limited thereto.

In an exemplary embodiment of the present specification, the unit cell may further comprise a sealing material. The sealing material is not particularly limited, as long as the sealing material has a heat expansion coefficient similar to those of the fuel electrode, air electrode, and connecting material of the unit cell and can hermetically seal the respective constitutions. Examples thereof comprise silica, alkali or alkaline rare earth oxide, and the like.

According to an exemplary embodiment of the present specification, the connecting material for a solid oxide fuel cell connects the plurality of unit cells in series.

According to an exemplary embodiment of the present specification, a connecting material of the m-th unit cell among the plurality of unit cells connects the m-th air electrode and the (m+1)-th fuel electrode in series. m is an integer of 1 or more.

MODE FOR INVENTION

Hereinafter, the present invention will be described in more detail through the Examples. These Examples are provided only for more specifically describing the present invention, and it will be obvious to a person with ordinary skill in the art that the scope of the present invention is not limited by these Examples.

EXPERIMENTAL EXAMPLE

Preparation Examples 1 to

A mixed solution in a sol state was prepared by dissolving the starting raw materials in the following Table 1 in D.I water to which ethylene glycol and citric acid were added in accordance with the weight ratio of each raw material. In this case, the citric acid and the starting raw material has a weight ratio of 2:1. In this case, the D.I water was evaporated by heating the mixed solution, and a mixed solution in a gel state was formed by a sol-gel process at 70° C. After the solution was dried, a calcined powder was prepared by heating the temperature at a heating rate of 3 to 5° C./min and maintaining the resulting product in an air atmosphere at 1,000° C. for 3 hours or more. A final powder was prepared by together mixing the calcined powder with zirconia balls.

Preparation Example 9

Starting raw materials were prepared as in Table 1, and these starting materials were introduced into a container formed of a polyethylene (PE) material, and then mixed with zirconia balls using D.I water as a solvent. Thereafter, the resulting solution was dried under a condition of 100° C., and then the temperature was increased at a heating rate of 3 to 5° C./min staring from 25° C., and the mixed powder was calcined by maintaining the temperature at 1,000° C. for 3 hours or more, thereby preparing a conductive oxide powder. That is, in Preparation Example 9, the power had the same composition as in Preparation Example 1, but was prepared by a solid phase synthesis method in the related art.

TABLE 1

| Preparation Example | Starting raw material (g) | | | | Composition of prepared powder |
|---|---|---|---|---|---|
| | Mn(NO$_3$)$_2$*6H$_2$O | CO(NO$_3$)$_2$*6H$_2$O | Cu(NO$_3$)$_2$•2.5H$_2$O | Y(NO$_3$)$_3$•6H$_2$O | |
| 1 | 74.63 | 75.67 | 11.25 | 7.66 | Mn$_{1.30}$Co$_{1.30}$Cu$_{0.3}$Y$_{0.1}$O$_4$ |
| 2 | 89.39 | 90.63 | 11.15 | 8.83 | Mn$_{1.35}$Co$_{1.35}$Cu$_{0.2}$Y$_{0.1}$O$_4$ |
| 3 | 71.76 | 72.76 | 11.25 | 15.32 | Mn$_{1.25}$Co$_{1.25}$Cu$_{0.3}$Y$_{0.2}$O$_4$ |
| 4 | 86.11 | 87.31 | — | — | Mn$_{1.50}$Co$_{1.5}$O$_4$ |
| 5 | 73.65 | 74.67 | 33.81 | 17.87 | Mn$_{1.1}$Co$_{1.1}$Cu$_{0.2}$Y$_{0.6}$O$_4$ |
| 6 | 63.15 | 64.02 | 11.25 | 38.30 | Mn$_{1.10}$Co$_{1.10}$Cu$_{0.3}$Y$_{0.5}$O$_4$ |
| 7 | 80.37 | 81.49 | — | 15.32 | Mn$_{1.40}$Co$_{1.40}$Y$_{0.2}$O$_4$ |
| 8 | 80.37 | 81.49 | 15.32 | — | Mn$_{1.40}$Co$_{1.40}$Cu$_{0.2}$O$_4$ |
| | Starting raw material (g) | | | | |
| | MnCO$_3$ | Co$_3$O$_4$ | CuO | Y$_2$O$_3$ | |
| 9 | 51.72 | 36.11 | 8.26 | 3.91 | Mn$_{1.30}$Co$_{1.30}$Cu$_{0.3}$Y$_{0.1}$O$_4$ |

Example 1

The prepared powder was granulated using a spray drying method. The spray drying means a process of obtaining spherical granules by spraying the raw material in a solution state in a high-temperature drying medium of a spray dryer.

A solution was prepared by mixing the powder in Preparation Example 1 and D.I water at a volume ratio of 1:9 and mixing 0.5 part by weight of a polyvinyl alcohol binder based on 100 parts by weight of the powder.

While the solution was supplied to a center of a disc of a rotary atomizer rotating at a high speed, the solution was atomized around the disc by the centrifugal force of the disc. In this case, the rotation speed of the disc was 9,000 rpm.

The solution released from the atomizer was introduced into a chamber and made a spray-air contact. In this case, the flow rate of hot wind in the chamber was 25 ml/min, and the temperature in the chamber was 180° C.

Thereafter, granules were formed by performing a heat treatment until 900° C. at a heating rate of 5° C./min, evaporating the binder, and aggregating the powder. FIG. 10 illustrates granules formed by aggregation of oxide particles in Example 1.

A conductive substrate (STS441) was coated with the granules by a plasma spray coating method. For uniform coating on the conductive substrate (STS441), the conductive substrate (ST441) was coated twice or more by varying the angles. In this case, the diameter of the granule in which the powder was aggregated was 30 µm, and before the coating, the conductive substrate was surface-treated using a sand blasting apparatus and an alumina powder. The surface distance (spray distance) between the plasma nozzle and the connecting material was 150 to 250 mm, and the moving speed of the spray gun was 100 to 300 mm/sec. Thus, a connecting material for a solid oxide fuel cell was manufactured by forming a ceramic protective film having a thickness of 20 µm to 30 µm.

Examples 2 and 3, Comparative Examples 1 to 5, and Reference Example 1

Granules in which the powder was aggregated were prepared in the same manner as in Example 1, except that the powder in the following Table 2 was used instead of the powder in Preparation Example 1, and a connecting material for a solid oxide fuel cell was manufactured by coating the granules in the same manner as in Example 1.

The powder used in Comparative Example 1 has two main peaks of Mn $2p_{1/2}$ and Mn $2p_{3/2}$. The two main peaks have a de-convoluted peak. Each of these peaks means $Mn^{2+}$ located at the tetrahedral site and $Mn^{3+}/Mn^{4+}$ located at the octahedral site. The type of ion corresponding to each peak is indicated in FIG. 3.

In the case of the powder used in Example 1, two main peaks appear at 635.06 eV (Mn $2p_{1/2}$) and 641.3 eV (Mn $2p_{3/2}$). The two main peaks are de-convoluted into three peaks, and two peaks corresponding to $Mn^{3+}$ of 640.6 eV and 653.02 eV and a peak corresponding to $Mn^{4+}$ of 642.1 eV appear. All of these ions are located at the octahedral site (FIG. 4).

Both Co $2p_{1/2}$ (795.06 eV) and Co $2p_{3/2}$ (779.9 eV) peaks have three de-convoluted peaks. The two peaks at 779.9 eV and 785.9 eV indicate $Co^{2+}$ located at the tetrahedral site, and a peak at 795.1 eV is a result due to $Co^{3+}$ located at the octahedral site.

Cu has three main peaks. The three main peaks correspond to Cu $2p_{1/2}$ (950.3, 945.02 eV) and Cu $2p_{3/2}$ (930.5 eV). The three peaks may be de-convoluted into three spin-orbital peaks and two satellite peaks. Among them, the two spin-orbital peaks correspond to $Cu^{2+}$ (930.4, 932.9 eV) and the peak at 952.6 eV corresponds to $Cu^+$ located at the tetrahedral site.

TABLE 2

| | | Example 1 | Example 2 | Example 3 | Comparative Example 1 | Comparative Example 2 | Comparative Example 3 | Comparative Example 4 | Comparative Example 5 | Reference Example 1 |
|---|---|---|---|---|---|---|---|---|---|---|
| Used powder | Composition | 1 | 2 | 3 | 4 | 5 | 6 | 7 | 8 | 9 |
| | Mn | 1.3 | 1.35 | 1.25 | 1.5 | 1.1 | 1.1 | 1.4 | 1.4 | 1.3 |
| | Co | 1.3 | 1.35 | 1.25 | 1.5 | 1.1 | 1.1 | 1.4 | 1.4 | 1.3 |
| | Cu | 0.3 | 0.2 | 0.3 | — | 0.3 | 0.2 | 0.2 | — | 0.3 |
| | Y | 0.1 | 0.1 | 0.2 | — | 0.5 | 0.6 | — | 0.2 | 0.1 |

Experimental Example 1: Observation of Powder Crystal Morphology According to Presence and Absence and Content of Y The crystal morphologies of the powders used in Examples 1 and 2 and Comparative Examples 1 and 2 were observed using an X-ray diffraction (XRD) analysis. The XRD peaks are illustrated in FIGS. 1 and 2. It could be confirmed that in the case of the powders used in Comparative Examples 1 and 2, the cubic phase and the tetragonal spinel phase were intermingled. In contrast, it could be confirmed that most of the powders used in Examples 1 and 2 were present as a cubic phase.

Through this, it was confirmed that when the powder did not comprise Cu and Y (Comparative Example 1) or included Y in a large amount even though comprising Cu and Y (Comparative Example 2), the cubic phase and the tetragonal spinel phase were intermingled in the powder.

Further, referring to FIG. 6, it can be confirmed that the phases of the powders used in Example 1 and Reference Example 1 were the same as each other even though the manufacturing methods were different.

Experimental Example 2: Observation of Valence State of Element According to Presence and Absence of Y The valence states of elements of the powders used in Example 1 and Comparative Example 1 were observed. Specifically, the valence state of each element included in the oxide was observed using X-ray photo-electron spectroscopy (XPS).

From this result, it can be confirmed that when Cu is added to MCO, it is possible to prevent the cation lattice of the spinel phase from being distorted (mitigated distortion).

Furthermore, the Y 3d orbital shows that peaks of Y $3d_{3/2}$ (158.8 eV) and Y $3d_{5/2}$ (156.8 eV) are de-convoluted. These indicate $Y^{3+}$ ion located at the octahedral site.

When copper is added, $Mn^{3+}$ and $Mn^{4+}$ ions are located at the same octahedral site by the transport mechanism of small polaron hopping.

Furthermore, the addition of copper may affect the valence state of element located at the octahedral site and may induce oxidation of $Mn^{2+}$ and $Mn^{3+}$ to $Mn^{3+}$ and $Mn^{4+}$ ions, respectively.

Meanwhile, in the case of the powder used in Example 1, the value of I4/I3 is 1.87, but in the case of the powder used in Comparative Example 1, the value of I4/I3 is 1.26, which is indicated at a low level.

Experimental Example 3: Measurement of Electrical Conductivity According to Content of Y The electrical conductivity was measured according to the temperature of the powders used in Examples 1 and 3 and Comparative Example 3. As the temperature is increased from 500° C. to 700° C., the semiconducting behavior aspect in which the electrical conductivity is increased is exhibited. In this case, the conductivity behavior may be represented by the following equation.

$$\sigma = \frac{C}{T} \exp\left(\frac{-Ea}{kT}\right)$$

In the equation, σ is an electrical conductivity (S/cm), C is a pre-exponential factor, k is a Boltzmann constant and has a unit of [eV/K], T is an absolute temperature [K], and Ea means the activation energy (eV) of the powder.

The electric conduction phenomenon occurs due to the small polaron hopping phenomenon of $Mn^{3+}$ and $Mn^{4+}$ ions located at the octahedral site of the powder. For the powder in Comparative Example 3, Mn cations ($Mn^{2+}$, $Mn^{3+}/Mn^{4+}$) are intermingled at the tetrahedral site and the octahedral site, so that the degree to which the small polaron hopping phenomenon between ions present in different planes occurs is small.

However, in the case of the powders in Examples 1 and 3, transfer of $Mn^{2+}$ and $Mn^{3+}$ ions to $Mn^{3+}$ and $Mn^{4+}$ occurs due to the addition of Cu ions, and the transferred manganese ions are present at the same octahedral site, so that the electrical conductivity is high because the small polaron hopping often happens.

Area specific resistance characteristics were measured according to the temperature under an air atmosphere using the DC 4 probe method. Specifically, after each oxide is molded into a pellet having a dimension of 3 mm (W)×3 mm (D)×15 mm (L), sintering is performed while increasing the temperature within a temperature range of 1,000 to 1,100° C. at a heating rate of 5° C./min to 10° C./min from a starting temperature of 25° C. Thereafter, for the measurement of the electrical conductivity, a resistance value is measured using a digital multimeter capable of 4-probe measurement, and then the conductivity is calculated in consideration of the distance between the sintered body bar and the electrode. The electrical conductivity according to the temperature is illustrated in FIG. 5.

In this case, it was confirmed that the electrical conductivity (S/cm) at 650° C. was 81.9 (Example 1), 64.2 (Example 3), and 2.1E-6 (Comparative Example 3). From the result, it was confirmed that when the powder comprises Y in an excessive amount, the electrical conductivity was reduced.

Experimental Example 4: Measurement of Heat Expansion Coefficient

In order to confirm the compatibility with a conductive substrate such as metal, the heat expansion coefficients of the powders in the Preparation Examples were measured. After the powders used in Example 1 and Reference Example 1 were molded into a pellet form, the length variations (ΔL) as compared to the initial length (L) of the pellet were measured and compared while increasing the temperature. Both the powders in Example 1 and Reference Example 1 exhibited a linear length variation, the heat expansion coefficient of the powder used in Example 1 was 11.28 ($10^{-6}$/K), and the heat expansion coefficient of the powder used in Reference Example 1 was 12.04 ($10^{-6}$/K). This is similar to 12.33 ($10^{-6}$/K) which is the heat expansion coefficient of the general ferritic stainless steel conductive substrate.

Experimental Example 5: Distribution of Diameters of Oxide Powder

The distribution of the diameters of the powder used in Example 1 is illustrated in FIG. 7, and the distribution of the diameters of the powder used in Reference Example 1 is illustrated in FIG. 8. The specific distributions of the diameters in Example 1 and Reference Example 1 are shown in the following Table 3. In the case of Reference Example 1, the oxide is prepared by a solid phase synthesis method, and the particle size was large, whereas in the case of Example 1, the oxide was prepared by the sol-gel method, and the particle size could be controlled at a low level.

TABLE 3

|  | Example 1 | Reference Example 1 |
| --- | --- | --- |
| D10 | 0.393 | 2.925 |
| D20 | 0.552 | 4.48 |
| D30 | 0.709 | 6.91 |
| D40 | 0.881 | 9.80 |
| D50 | 1.084 | 12.01 |
| D60 | 1.343 | 14.32 |
| D70 | 1.716 | — |
| D80 | 2.432 | 27.66 |
| D90 | 5.73 | 39.99 |
| D95 | 13.40 | 54.15 |

From the results in Experimental Example 5, it was confirmed that unlike the case where the solid phase synthesis method in the related art was used, when the powder synthesis method of the present invention was used, the particle size was controlled at a low level.

Experimental Example 6: Measurement of Area Specific Resistance According to Content of Y A laminate was manufactured by coating an STS431 plate with a size of 2 cm×2 cm with a connecting material sample having the same composition as that of the powder used in Example 2. Thereafter, the area specific resistance of the laminate at 650° C. was measured, and the results are illustrated in FIG. 12. It can be confirmed that the area specific resistance of the powder is exhibited at a low level of 0.15 to 0.03 Ω/cm². From the results, it was confirmed that the powder of the present invention had a low area specific resistance.

Meanwhile, the area specific resistance according to the temperature was measured by manufacturing a ceramic sample test specimen composed of the powder each used in Example 2 and Comparative Example 3, and the results are illustrated in FIG. 13.

In Example 1 where the content of Y of the powder was 0.1, the area specific resistance was measured at a low level of about 0.005 Ω/cm², and in Comparative Example 3 where the content of Y of the powder was 0.6, the area specific resistance was measured at a high level of about 0.019 Ω/cm². This is because the powder in Example 1 is adjusted such that the content of Y is low, so that the phase of the oxide exhibits a single cubic phase, and as a result, the stability of the phase is increased.

In contrast, in Comparative Example 3, the reason is because Y is included in a large amount, so that the cubic phase and the tetragonal phase are intermingled, and the stability of the phase slightly deteriorates (see FIG. 2).

Experimental Example 7: Observation of Interfacial Stability

After a connecting material for a solid oxide fuel cell in which a ceramic protective film having the same composition as in Example 1 is formed on a conductive substrate was manufactured, the cross section thereof was observed. In this case, a TM 3030 Plus apparatus was used. As a result, it was confirmed that a dense ceramic protective film having a particle size of 20 μm to 30 μm was formed (FIG. 14). From the result, it was confirmed that due to the excellent bonding strength of the powder of the present invention to a conductive substrate, the interfacial stability was improved.

The invention claimed is:

1. A connecting material for a solid oxide fuel cell, comprising:
   a conductive substrate; and
   a ceramic protective film provided on one surface of the conductive substrate,
   wherein the ceramic protective film comprises an oxide represented by the following Formula 1:

$$Mn_{x1}Co_{x2}Cu_{y1}Y_{z1}O_{4-\delta} \quad \text{[Formula 1]}$$

in Formula 1, x1, x2, y1, and z1 denote a molar ratio of each component and satisfy the ranges of $0<x1\leq1.5$, $0<x2\leq1.5$, $0<y1\leq0.5$, and $0.1<z1\leq0.4$, and
   δ is a value that makes the oxide neutral,
   wherein the oxide represented by Formula 1 is stabilized as a cubic phase by a volume ratio of 95% or more.

2. The connecting material for a solid oxide fuel cell of claim 1, wherein as a result of an X-ray diffraction (XRD) analysis, the oxide represented by Formula 1 has a single peak at 2θ at each of the following ranges: in a range of 30 degrees to 32 degrees, 35 degrees to 37 degrees, 55 degrees to 58 degrees, and 62 degrees to 65 degrees.

3. The connecting material for a solid oxide fuel cell of claim 1, wherein as a result of subjecting the oxide represented by Formula 1 to an X-ray photo-electron spectroscopy (XPS) analysis, for the $2p_{3/2}$ orbital of Mn in the oxide, a peak (P3) is present within a binding energy range of 640.6±0.2 eV and a peak (P4) is present within a binding energy range of 643±0.2 eV.

4. The connecting material for a solid oxide fuel cell of claim 3, wherein a ratio of a peak intensity (I3) within the binding energy range of 640.6±0.2 eV to a peak intensity (I4) within the binding energy range of 643±0.2 eV satisfies a range of $1.0\leq I4/I3\leq2.0$.

5. The connecting material for a solid oxide fuel cell of claim 1, wherein electrical conductivity of the ceramic protective film at 650° C. is 30 S/cm or more.

6. The connecting material for a solid oxide fuel cell of claim 1, wherein an area specific resistance (ASR) of the ceramic protective film at 650° C. is 0.1 Ωcm² or less.

7. The connecting material for a solid oxide fuel cell of claim 1, wherein a heat expansion coefficient of the ceramic protective film at 650° C. is 11 ($10^{-6}*K^{-1}$) to 12($10^{-6}*K^{-1}$).

8. The connecting material for a solid oxide fuel cell of claim 1, wherein the ceramic protective film has a thickness of 10 μm to 30 μm.

9. The connecting material for a solid oxide fuel cell of claim 1, wherein the conductive substrate is a ferritic stainless steel (FSS) substrate.

10. A method for manufacturing the connecting material for a solid oxide fuel cell according to claim 1, the method comprising:
    producing a powder of an oxide represented by the following Formula 1; and
    forming a ceramic protective film comprising an oxide represented by the following Formula 1 on one surface of a conductive substrate:

$$Mn_{x1}Co_{x2}Cu_{y1}Y_{z1}O_{4-\delta} \quad \text{[Formula 1]}$$

in Formula 1, x1, x2, y1, and z1 denote a molar ratio of each component and satisfy the ranges of $0<x1\leq1.5$, $0<x2\leq1.5$, $0<y1\leq0.5$, and $0.1<z1\leq0.4$, and
    δ is a value that makes the oxide neutral.

11. The method of claim 10, where the producing of the oxide represented by Formula 1 comprises:
    forming a mixed solution in a sol state by mixing a raw material powder, a solvent, and citric acid;
    gelling the mixed solution in a sol state by heating the mixed solution;
    drying the gel compound; and
    calcining the dried compound.

12. The method of claim 10, wherein the forming of the ceramic protective film is a step by a plasma spray coating.

13. The method of claim 11, wherein the raw material powder comprises one or more selected from the group consisting of $Mn(NO_3)_2$; $Co(NO_3)_2$; $Y_2O_3$ and $Y(NO_3)_3$; and one or more selected from the group consisting of CuO and $Cu(NO_3)_2$.

14. A solid oxide fuel cell comprising:
    two or more unit cells; and
    a connecting material layer comprising the connecting material for a solid oxide fuel cell of claim 1 provided between the two or more unit cells,
    wherein the unit cell comprises a fuel electrode, an air electrode, and an electrolyte provided between the fuel electrode and the air electrode, and
    the connecting material layer is brought into contact with the air electrode or fuel electrode of the unit cell.

* * * * *